US012804568B2

(12) United States Patent
Huang et al.

(10) Patent No.: US 12,804,568 B2
(45) Date of Patent: Nov. 17, 2026

(54) SYSTEMS AND METHODS FOR EVENT TRIGGERED TIMING MISMATCH CALIBRATION IN DISTRIBUTED MIMO USING HISTORICAL MEASUREMENTS

(71) Applicant: Samsung Electronics Company, Ltd., Suwon si (KR)

(72) Inventors: Rui Huang, Vancouver (CA); Nadisanka Rupasinghe, Dallas, TX (US); Kyung-Joong Kim, Suwon (KR)

(73) Assignee: Samsung Electronics Company, Ltd., Suwon City (KR)

( * ) Notice: Subject to any disclaimer, the term of this patent is extended or adjusted under 35 U.S.C. 154(b) by 364 days.

(21) Appl. No.: 18/585,710

(22) Filed: Feb. 23, 2024

(65) Prior Publication Data

US 2025/0274881 A1 Aug. 28, 2025

(51) Int. Cl.
*H04W 56/00* (2009.01)
*H04B 7/024* (2017.01)

(52) U.S. Cl.
CPC .......... *H04W 56/001* (2013.01); *H04B 7/024* (2013.01); *H04W 56/0035* (2013.01)

(58) Field of Classification Search
CPC . H04W 56/001; H04W 56/0035; H04B 7/024
See application file for complete search history.

(56) References Cited

U.S. PATENT DOCUMENTS 11,296,766 B2 4/2022 Kang
11,451,312 B2 9/2022 Rodriguez-Herrera
(Continued)

FOREIGN PATENT DOCUMENTS

CN 116545547 A 8/2023
EP 1499027 B1 12/2010
WO WO 2021063520 A1 4/2021

OTHER PUBLICATIONS

International search report and Written Opinion received for PCT Application No. PCT/KR2024/015204, 8 pages, Jan. 10, 2025.
(Continued)

*Primary Examiner* — Kiet Tang
(74) *Attorney, Agent, or Firm* — Baker Botts L.L.P.

(57) ABSTRACT

In one embodiment, a method includes accessing reference signals collected from multiple iterations of timing and phase calibration, wherein each of the reference signals includes calibrated phase measurements at multiple sub-frequency bands, determining updated calibrated phase measurements at the sub-frequency bands based on reference signals from a first number of most recent iterations and one or more decision rules, determining whether a calibrated timing and phase mismatch satisfies a target requirement based on one or more of a convergence condition or a divergence condition, wherein the convergence condition is based on the updated calibrated phase measurements and the divergence condition is based on reference signals from a second number of most recent iterations, and determining a timing and phase mismatch between transmission signals based on the updated calibrated phase measurements and generating an integrated transmission signal accordingly if the calibrated timing and phase mismatch does not satisfy the target requirement.

20 Claims, 10 Drawing Sheets

(56) References Cited

U.S. PATENT DOCUMENTS

| | | | | |
|---|---|---|---|---|
| 2005/0169357 A1* | 8/2005 | Sedarat | H04L 27/2657 | 375/222 |
| 2008/0310318 A1* | 12/2008 | Bang | H04B 17/12 | 370/252 |
| 2010/0271092 A1* | 10/2010 | Zerbe | G11C 11/4076 | 327/161 |
| 2015/0304068 A1* | 10/2015 | Xiong | H03F 1/3241 | 375/267 |
| 2020/0204239 A1* | 6/2020 | Kang | H04B 7/0691 | |
| 2023/0258759 A1* | 8/2023 | Wang | G01S 5/0036 | 455/456.1 |

OTHER PUBLICATIONS

U.S. Appl. No. 63/522,059, filed Jun. 20, 2023, Nguyen.
U.S. Appl. No. 63/426,996, filed Nov. 21, 2022, Nadisanka.
U.S. Appl. No. 18/405,751, filed Jan. 5, 2024, Huang.
3GPP, "E-UTRA, Physical channels and modulation", TS 36.211, Version 16.4.0, Release 16, 251 pages. https://www.etsi.org/deliver/etsi_ts/136200_136299/136211/16.04.00_60/ts_136211v160400p.pdf, Feb. 2021.
3GPP, "LTE, E-UTRA, Multiplexing and Channel coding", TS 36.212, Version 16.4.0, Release 16, 259 pages. https://www.etsi.org/deliver/etsi_ts/136200_136299/136212/16.04.00_60/ts_136212v160400p.pdf, Jan. 2021.
3GPP, "LTE, E-UTRA, Physical Layer Procedures", TS 36.213, Version 16.4.0, Release 16, 577 pages. https://www.etsi.org/deliver/etsi_ts/136200_136299/136213/16.04.00_60/ts_136213v160400p.pdf, Feb. 2021.
3GPP, "LTE, E-UTRA, Medium Access Control (MAC) protocol specification", TS 36.321, Version 16.3.0, 144 pages. https://www.etsi.org/deliver/etsi_ts/136300_136399/136321/16.03.00_60/ts_136321v160300p.pdf, Jan. 2021.
3GPP, "LTE-E-UTRA, Radio Resource Control (RRC) Protocol Specification", TS 36.331 Version 16.3.0, Release 16, 1089 pages. https://www.etsi.org/deliver/etsi_ts/136300_136399/136331/16.03.00_60/ts_136331v160300p.pdf, Jan. 2021.
3GPP, "5GNR, Physical channels and modulation", TS 38.211, Version 16.4.0, Release 16, 137 pages. https://www.etsi.org/deliver/etsi_ts/138200_138299/138211/16.04.00_60/ts_138211v160400p.pdf, Jan. 2021.
3GPP, "5GNR, Multiplexing and Channel coding" TS 38.212, Version 16.4.0, Release 16, 155 pages. https://www.etsi.org/deliver/etsi_ts/138200_138299/138212/16.04.00_60/ts_138212v160400p.pdf, Jan. 2021.
3GPP, "NR, Physical Layer Procedures for Control", TS 38.213, Version 16.4.0, Release 16, 185 pages. https://www.etsi.org/deliver/etsi_ts/138200_138299/138213/16.04.00_60/ts_138213v160400p.pdf, Jan. 2021.
3GPP, "5GNR, Physical Layer Procedures for Data", TS 38.214, Version 16.4.0, Release 16, 173 pages. https://www.etsi.org/deliver/etsi_ts/138200_138299/138214/16.04.00_60/ts_138214v160400p.pdf, Jan. 2021.
3GPP, "5GNR, Physical Layer Measurements", TS 38.215, Version 16.4.0, Release 16, 31 pages. https://www.etsi.org/deliver/etsi_ts/138200_138299/138215/16.04.00_60/ts_138215v160400p.pdf, Jan. 2021.
3GPP, "5GNR, Medium Access Control (MAC) protocol specification", TS 38.321, Version 16.3.0, Release 16, 158 pages. https://www.etsi.org/deliver/etsi_ts/138300_138399/138321/16.03.00_60/ts_138321v160300p.pdf, Jan. 2021.
3GPP, "5GNR, Radio Resource Control (RRC) Protocol Specification", TS 38.331, Version 16.3.1, Release 16, 916 pages. https://www.etsi.org/deliver/etsi_ts/138300_138399/138331/16.03.01_60/ts_138331v160301p.pdf, Jan. 2021.

* cited by examiner

SYSTEMS AND METHODS FOR EVENT TRIGGERED TIMING MISMATCH CALIBRATION IN DISTRIBUTED MIMO USING HISTORICAL MEASUREMENTS

TECHNICAL FIELD

This disclosure relates generally to calibration mechanism for distributed multiple-input and multiple-output (MIMO) operations, and in particular relates to systems and methods for user equipment assisted calibration mechanism in distributed MIMO.

BACKGROUND

For a cellular system operating in low carrier frequency in general, a sub-1 GHz frequency range (e.g. less than 1 GHz) as an example, supporting large number of channel state information reference signal (CSI-RS) antenna ports (e.g., 32) or many antenna elements at a single location or remote radio head (RRH) is challenging due to a larger antenna form factor size needed considering carrier frequency wavelength than a system operating at a higher frequency such as 2 GHz or 4 GHz. At such low frequencies, the maximum number of CSI-RS antenna ports that can be co-located at a site (or RRH) can be limited, for example to 8. This limits the spectral efficiency of such systems. In particular, the multi-user MIMO (MU-MIMO) spatial multiplexing gains offered due to large number of CSI-RS antenna ports (such as 32) cannot be achieved due to the antenna form factor limitation. One way to operate a system with large number of CSI-RS antenna ports at low carrier frequency is to distribute the physical antenna ports to different panels/RRHs, which can be possibly non-collocated. The multiple sites or panels/RRHs can still be connected to a single (common) base unit forming a single antenna system, hence the signal transmitted/received via multiple distributed RRHs can still be processed at a centralized location. With small antennas at each RRH, higher spatial multiplexing can be achieved with join processing from distributed transmission reception points (TRPs).

DESCRIPTION OF EXAMPLE EMBODIMENTS

Figure 1:
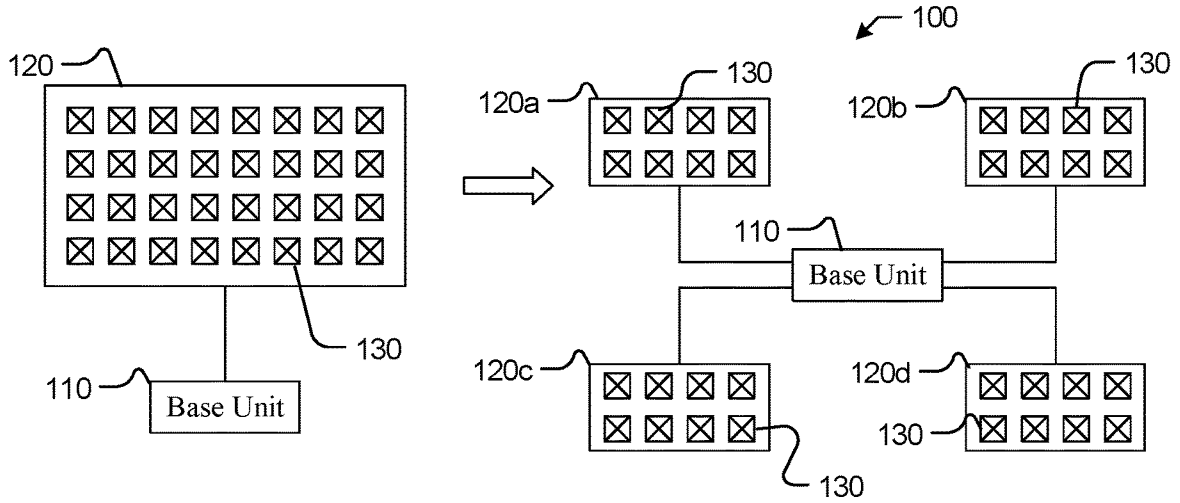
FIG. 1 illustrates an example distributed MIMO.

Event Triggered Timing Mismatch Calibration in Distributed MIMO Using Historical Measurements In particular embodiments, a communication device may estimate and maintain the accurate timing mismatch (e.g., the correct timing-phase slope) within the operation-wide bandwidth based on phase offset measurements between two or more distributed MIMO transceivers using multiple reference signals (e.g., precoding matrix indicator reports) at different frequency bands received over multiple calibration iterations (i.e., including the historical measurements received previously). Depending on the implementation of particular embodiments, one calibration iteration may correspond to one or more transmission time interval (TTI) in practical distributed MIMO systems. Based on operating bandwidths, target timing mismatch, target calibration error of distributed MIMO systems, as well as the historical measurements received over the previous calibration process, the communication device may guarantee that the calibrated phase timing mismatch be within the target timing mismatch of the distributed MIMO throughout the calibration process, given the possibility that the timing and phase mismatches can be time-varying. Although disclosure describes particular calibrations by particular systems in particular manners, this disclosure contemplates any suitable calibration by any suitable system in any suitable manner.

In particular embodiments, the communication device may access a plurality of reference signals collected from a plurality of respective iterations of timing and phase calibration. Each of the reference signals may comprise a plurality of calibrated phase measurements at a plurality of respective sub-frequency bands over a particular frequency band allocated for signal transmission. In particular embodiments, the communication device may determine, based on one or more first reference signals of the plurality of reference signals from one or more first most recent iterations of the plurality iterations and one or more decision rules, a plurality of updated calibrated phase measurements at the plurality of respective sub-frequency bands. The communication device may then determine, based on one or more of a convergence condition or a divergence condition, whether a calibrated timing and phase mismatch satisfies a target requirement. In particular embodiments, the convergence condition may be based on the plurality of updated calibrated phase measurements at the plurality of respective sub-frequency bands. The divergence condition may be based on one or more second reference signals of the plurality of reference signals from one or more second most recent iterations of the plurality of iterations. Based on determining the calibrated timing and phase mismatch does not satisfy the target requirement, the communication device may determine, based on the plurality of updated calibrated phase measurements at the plurality of respective sub-frequency bands, a timing and phase mismatch between a plurality of transmission signals. Based on determining the calibrated timing and phase mismatch does not satisfy the target requirement, the communication device may further generate, based on the determined timing and phase mismatch, an integrated transmission signal from the plurality of transmission signals.

Certain technical challenges exist for timing mismatch calibration in distributed MIMO systems using historical measurements. One technical challenge may include recovering correct reference-signal reports. The solution presented by the embodiments disclosed herein to address this challenge may be using reference-reports received over multiple recent iterations to determine the actual reference-signal reports based on different decision rules as patterns may be uncovered from these reference-signal reports with the decision rules to recover the correct reference-signal reports. Another technical challenge may include keeping track of the timing-varying nature of time-phase mismatch may be keeping checking frequently whether the previously calibrated timing and phase mismatch is still applicable in the current distributed MIMO system based on a divergence condition as the divergence condition indicates the calibrated timing and phase mismatch can no longer meet the requirement and triggers the updating of the calibration process. The solution presented by the embodiments disclosed herein to address this challenge may be determining statistical correlations between the measurements as well as their corresponding frequency bands as the statistical correlations may improve the robustness to the measurement errors.

Certain embodiments disclosed herein may provide one or more technical advantages. A technical advantage of the embodiments may include robustness to errors of reference-signal reports as these errors may be identified and recovered, thereby providing more accurate calibration results under the presence of these errors. Another technical advantage of the embodiments may include requiring less signaling and having a lower computational complexity as signaling is not needed after the target calibration accuracy is deemed to be satisfied. Another technical advantage of the embodiments may include detecting potential changes in timing and phase mismatches between multiple transmission reception points throughout the calibration process as when the changes in mismatches are detected, the embodiments disclosed herein can re-trigger the process of updating the timing and phase mismatches until the required calibration accuracy is achieved again. Certain embodiments disclosed herein may provide none, some, or all of the above technical advantages. One or more other technical advantages may be readily apparent to one skilled in the art in view of the figures, descriptions, and claims of the present disclosure.

At lower frequency bands such as FR1 or particularly sub-1 GHz band, the number of antenna elements cannot be increased in a given form factor due to large wavelength while maintaining a critical distance (e.g., $\geq\lambda/2$) between two adjacent antenna elements. As an example and not by way of limitation, for the case of the wavelength size ($\lambda$) of the center frequency 600 MHz (which may be approximately 50 cm), it may require 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, may become very large in such lower frequency bands, and it may lead to the difficulty of deploying two-dimensional (2D) antenna arrays within the size of a conventional form factor. This may result in a limited number of physical antenna elements and, subsequently CSI-RS ports, that can be supported at a single site and limit the spectral efficiency of such systems.

One possible approach to resolve the issue may be to form multiple antenna panels (e.g., antenna modules, RRHs) with a small number of antenna ports instead of integrating all of the antenna ports in a single panel (or at a single site) and to distribute the multiple panels in multiple locations/sites (or RRHs). FIG. 1 illustrates an example distributed MIMO 100. The distributed MIMO 100 may comprise a base unit 110 and multiple panels 120 such as 120a, 120*b*, 120*c*, and 120*d*. Each panel 120 may comprise a small number of antenna ports 130.

Figure 2:
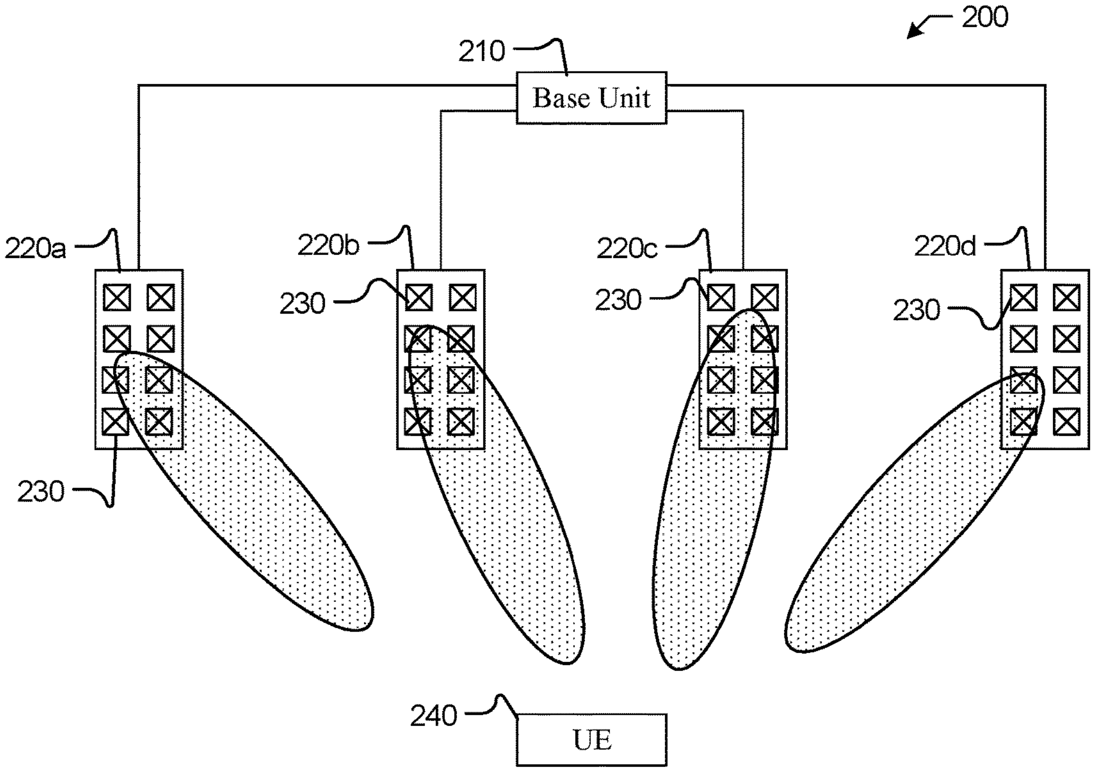
FIG. 2 illustrates another example distributed MIMO.

The multiple antenna panels at multiple locations may still be connected to a single base unit, and thus the signal transmitted/received via multiple distributed panels may be processed in a centralized manner through the single base unit. FIG. 2 illustrates another example distributed MIMO 200. The distributed MIMO 200 may comprise a base unit 210 and multiple panels 220 such as 220a, 220*b*, 220*c*, and 220*d*. Each panel 220 may comprise a small number of antenna ports 230. Each panel 220 may communicate with a user equipment (UE) 240. The base unit may perform operations such as base band signal processing, computations, and other operations that are necessary for the transmission and receptions of wireless signals. In another embodiment, it may be possible that multiple distributed antenna panels are connected to more than one base units, which may communicate with each other and jointly support a single antenna system.

In time division duplexing (TDD), a common approach to acquire downlink channel state information may be to use uplink channel estimation through receiving uplink reference signals (e.g., sounding reference signal) sent from user equipment. By using the channel reciprocity in TDD systems, the uplink channel estimation itself may be used to infer downlink channels. This favorable feature may enable network to reduce the training overhead significantly. However, due to the radio frequency (RF) impairment at transmitter and receiver, directly using the uplink channels for downlink channels may be not accurate and it may require a calibration process (periodically) among receive and transmit antenna ports of the RF network. In general, network may have an on-board calibration mechanism in its own RF network to calibrate its antenna panels having a plurality of receiver/transmitter antenna ports, to enable downlink/uplink channel reciprocity in channel acquisition. The on-board calibration mechanism may be performed via small-power reference signal transmission and reception from/to the RF antenna network of network and thus it may be done by network's implementation in a confined manner (i.e., that may not interfere with other entities). However, it may become difficult to perform the on-board calibration in distributed MIMO systems due to the distribution of the panels/RRHs over a wide region, and thus it may require over-the-air (OTA) signaling mechanisms to calibrate receive/transmit antenna ports among multiple RRHs/panels far away in distributed MIMO.

As discussed in the aforementioned challenges, timing calibration may be an important issue for distributed MIMO in general. Massive MIMO base stations may use an on-board coupling network and calibration circuits, which may be referred to as the on-board calibration for brevity, to measure the gain and phase differences among transceivers in the same radio frequency (RF) unit in order to maintain the reciprocity between downlink and uplink channels in the TDD system. For the on-board calibration, one RF chain corresponding to one antenna port may serve as a reference to other RF chains for other antenna ports. In the case of the distributed MIMO, such reference transceiver's signal may need to be shared between distributed RRHs/panels/modules, which may be physically far apart. Using RF cables to distribute the reference may be not preferable as it may limit the deployment scenarios. In the distributed MIMO, the use of different local oscillators between distributed antenna modules may impose even more challenges in achieving calibration as the phase of local oscillators may drift. Periodic calibration may be needed to compensate for the phase drift. However, this phase drift (or phase offset) may be changing with frequency due to timing mismatch between multiple distributed RRHs/panels/modules. Thus, conventional phase calibration algorithms to compensate a phase drift at a frequency band may be not sufficient. Phase-timing slope calibration may be important to guarantee the distributed MIMO performance according to theoretical analysis.

The embodiments disclosed herein disclose user equipment assisted calibration methods for distributed MIMO systems using the measurements obtained based on the transmissions and receptions of reference signals. As an example and not by way of limitation, the one or more reference signals may comprise one or more of a precoding-matrix-indicator (PMI) report, a channel-state-information reference signal (CSI-RS), a sounding reference signal (SRS), a demodulation reference signal (DMRS), or any suitable reference signal. The embodiments disclosed herein use precoding matrix indicator (PMI) reports as an example to illustrate the disclosed methods. However, the disclosed method may also be applied to systems where the measurements are obtained using other reference signals, such as CSI-RS, SRS, and demodulation reference signals (DMRS). More information on PMI reports may be found in U.S. Provisional Patent Application No. 63/153,653, which is incorporated by reference.

Although low-band TDD systems may be exemplified for motivation purposes, the embodiments disclosed herein can be applied to any frequency band in FR1 and/or FR2 and/or frequency division duplexing (FDD) systems. Furthermore, all the disclosed components and embodiments can be applicable for uplink transmission when the scheduling unit in time is either one subframe (which may consist of one or multiple slots) or one slot. As a result, the embodiments disclosed herein may have a technical advantage of simplicity of implementation and compatibility with current hardware implementation and 3GPP standardization as the disclosed embodiments can be applied to any frequency band in FR1 and/or FR2 and/or FDD systems.

Figure 3:
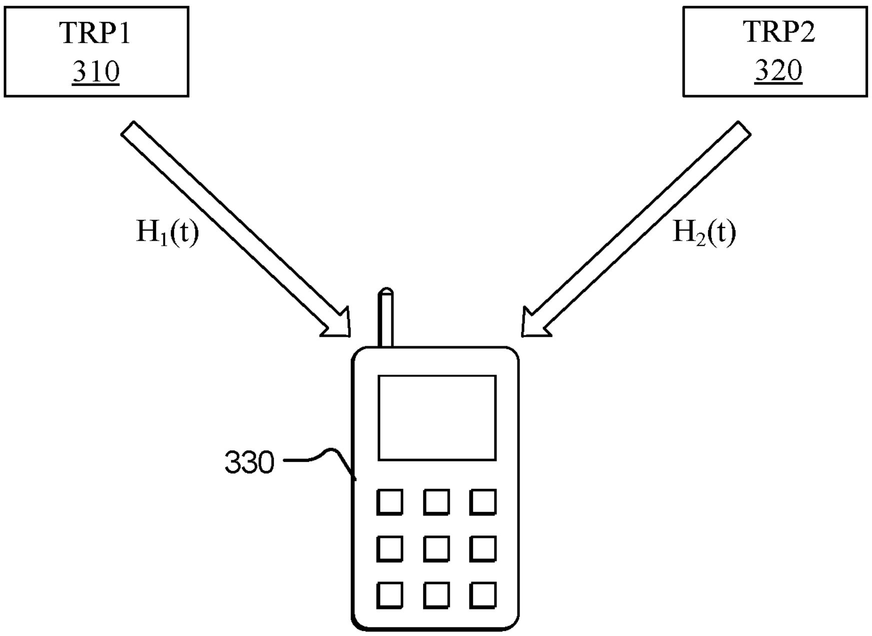
FIG. 3 illustrates an example joint transmission from two TRPs to a single user equipment.

FIG. 3 illustrates an example joint transmission from two TRPs to a single user equipment. Particular embodiments may formulate the joint transmission problem by incorporating all the possible impairments come across in a real-world operation. As illustrated in FIG. 3, there may be a single-user (SU) multi-carrier downlink data transmission from two transmission reception points (TRPs) (e.g., TRP1 310 and TRP2 320) to a user equipment 330.

Depending on the implementation of particular embodiments, one calibration iteration may correspond to one or more transmission time interval (TTI) in practical distributed MIMO systems. For the system illustrated in FIG. 3, at the t-th (t=1, 2, 3, . . . ) iterations of calibration process, the received signal at the user equipment 330 may be given by:

$$y(f,t)=\alpha\big(H_1(f,t)P_1(t)+e^{j(2\pi\Delta\tau(t)f+\Delta\varphi_0(t))}H_2(f,t)P_2(t)\big)x(t)+n(t), \tag{1}$$

where x(t) is the transmitted data symbols from two TRPs. $H_i(f, t)$, $P_i(t)$ are channel and precoding vector, respectively of f-th sub-carrier from i-th TRP, where $i\in\{1, 2\}$, and n(t) is additive white Gaussian (AWGN) noise at the user equipment at the t-th iteration. Moreover, in equation (1), $\Delta\varphi_0(t)$ is the phase offset arising due to radio frequency impairments and $\Delta\tau(t)$ is the timing mismatch between TRP1 310 and TRP2 320. In particular embodiments, $\Delta\varphi_0(t)$ is a common phase offset on all the sub-carriers for downlink and/or uplink transmissions, while $\Delta\tau(t)$ generates a phase ramp across sub-carriers. The present disclosure denotes the resultant phase offset due to phase and timing mismatches as $\varphi(f, t)=2\pi\Delta\tau(t)f+\Delta\varphi_0(t)$. Note that in practice, both $\Delta\varphi_0(t)$ and $\Delta\tau(t)$ may be time-varying, that is, $\Delta\varphi_0(t)\neq\Delta\varphi_0(t')$, $\Delta\tau(t)\neq\Delta\tau(t')$, for any $t\neq t'$.

Note that, the same phase offset may be observed for multiple sub-carriers as long as the following condition is satisfied:

$$e^{j(2\pi\Delta\tau(t)f_1+\Delta\varphi_0(t))}=e^{j(2\pi\Delta\tau(t)f_2+\Delta\varphi_0(t))}, \tag{2}$$

$$(2\pi\Delta\tau(t)f_1+\Delta\varphi_0(t))\bmod 2\pi=(2\pi\Delta\tau(t)f_2+\Delta\varphi_0(t))\bmod 2\pi,$$

for $f_1\neq f_2$.

According to equation (1), without the knowledge of phase offset $\Delta\varphi_0(t)$ and timing mismatch $\Delta\tau(t)$, the signals received from two TRPs may not be constructively combined at the serving user equipment 330. As the consequences, the signals received from two TRPs may not necessarily contribute to a higher signal-to-noise-plus-interference ratio (SINR) and thereby deteriorating the potential performance improvements of joint transmission. Hence, $\Delta\varphi_0(t)$ and $\Delta\tau(t)$ may need to be sufficiently compensated in order to fully exploit the gains of joint transmission. This may justify the requirement of a robust calibration algorithm to correct those phase/timing impairments prior to the actual data transmission. This may be a challenging task, given additional constrains such as limited information exchange between TRPs in commercial 5G networks.

Particular embodiments may compensate the relative phase difference between two TRPs in a given time and frequency. In particular embodiments, the phase offset may comprise the following components: (i) the relative timing offset and, (ii) the common phase offset between two TRPs as shown in equation (2). Timing mismatch of two TRPs may be due to the relative timing offset difference that depends on processing time offsets of electronics and processing components within each TRP processing data flow. While the common phase $\Delta\phi_0(t)$ may not depend on frequency, the timing mismatch $\Delta\tau(t)$ may be linearly dependent on frequency of the signals. From equation (2), the phase timing calibration algorithm may determine the correct phase timing slope in addition to the phase offset calibration algorithms. In addition, particular embodiments may tackle the time-varying nature of $\Delta\varphi_0(t)$ and $\Delta\tau(t)$ so that a high calibration accuracy can be maintained throughout the calibration process.

To get correct the phase timing slope within a bandwidth, particular embodiments may leverage multiple reference signals to obtain multiple calibrated phase measurements (e.g., PMI reports) at multiple different frequency bands. In particular embodiments, the measurements may be the reports or signaling sent back by user equipment. The present disclosure denotes the total number of different frequency bands as K, where K>1. The present disclosure denotes $\varphi(k, t)$ as the PMI reports sent from the user equipment to the TRP at the k-th frequency band in the t-th iteration of the calibration process, where k=1, 2, . . . , K, and t=1, 2, . . . . Due to noises from various sources, such as wireless channels and hardware impairments, PMI report errors may occur, leading to incorrect p(k, t) received by the TRP.

In order to recover the correct PMI reports from the potential errors, in particular embodiments, for each of the k-th frequency subbands, where k∈ {1, 2, . . . , K}, the TRP may use the PMI reports received over the most recent D iterations for the k-th frequency band to determine the actual PMI reports that should be used for the calibration in the t-th iteration, which the present disclosure denotes as p̂(k, t). That is, starting from the PMI report received in the t-th iteration, i.e., φ(k, t), to the PMI report received in the (t−D+1)-th iteration, i.e., φ(k, t−D+1). For notation ease, the present disclosure collects all these reports in a set $\mathcal{P}$ (k, t)={φ(k, t), φ(k, t−1), . . . , p(k, t−D+1)}.

In order to store the D PMI reports for each of the K sub-bands, as an example and not by way of limitation, the following D×K matrix may be maintained by at the TRP:

$$M = \begin{bmatrix} p(1, t) & p(2, t) & \dots & p(K, t) \\ \vdots & \vdots & \vdots & \vdots \\ p(1, t-D+1) & p(2, t-D+1) & \dots & p(K, t-D+1) \end{bmatrix}, \tag{3}$$

in which the elements on the k-th column are the PMI reports received for the most recent D iterations, and the elements on the first row are the K PMI reports of K different subbands received in the t-th iteration, and the elements on the last row are the K PMI reports of K different subbands received in the (t−D+1)-th iteration.

In particular embodiments, the TRP may determine the PMI report for the k-th frequency band in the t-th iteration by the majority of the received D PMI reports in set $\mathcal{P}$ (k, t). That is, the TRP may use the most frequent element in set $\mathcal{P}$ (k, t) as the PMI report for calibration. As an example and not by way of limitation for k=1 and D=3, and consider the recently received D=3 PMI reports as $\mathcal{P}$ (1, t)={1, 1, 2}, the TRP may decide the actual PMI report for calibration as p̂(k, t)=1 since 1 is the most frequent element in $\mathcal{P}$ (1, t).

In the case of a tie (i.e., more than one element in $\mathcal{P}$ (k, t) have the same frequency), in one embodiment, the TRP may randomly select one element from those elements that are most frequent as the actual PMI report p̂(k, t). In another embodiment, the TRP may choose the element with the minimum value from those elements that are most frequent as the actual PMI report p̂(k, t). In yet another embodiment, the TRP may use the element with the maximum value from those elements that are most frequent as the actual PMI report p̂(k, t). As a result, the embodiments disclosed herein may have a technical advantage of robustness to errors of reference-signal reports as these errors may be identified and recovered, thereby providing more accurate calibration results under the presence of these errors.

As described above, the one or more first reference signals may comprise one or more first calibrated phase measurements (e.g., PMI reports) at a first sub-frequency band. Correspondingly, the plurality of updated calibrated phase measurements (e.g., corrected PMI reports) may comprise a first updated calibrated phase measurement at the first sub-frequency band. In particular embodiments, the one or more decision rules comprise one or more of determining the first updated calibrated phase measurement as a most frequent measurement among the one or more first calibrated phase measurements, determining the first updated calibrated phase measurement as a minimum measurement from one or more most frequent measurements among the one or more first calibrated phase measurements, or determining the first updated calibrated phase measurement as a maximum measurement from the one or more most frequent measurements among the one or more first calibrated phase measurements. Using reference-reports received over multiple recent iterations to determine the actual reference-signal reports based on different decision rules to address the technical challenge of recovering correct reference-signal reports as patterns may be uncovered from these reference-signal reports with the decision rules to recover the correct reference-signal reports.

Note that parameter D is the design parameter of the embodiments disclosed herein. In particular embodiments, the communication device may determine the one or more first most recent iterations based on one or more of a target calibration accuracy, a robustness to errors associated with the reference signals, a memory limitation, a target convergence rate, or a target response time. By using a larger D, particular embodiments may achieve a higher calibration accuracy and may be more robust to PMI report errors. Meanwhile, more memory spaces at the TRPs may be required with a larger D. Moreover, using a larger D may lead to a slower convergence rate, as well as a slower response to the changes in timing and phase mismatches.

Based on the PMI reports determined for each sub-band k∈ {1, . . . , K}, in particular embodiments, the TRP may first check if the calibrated timing and phase already satisfies the target requirement. In particular embodiments, the TRP may check a convergence condition, according to which the TRP can determine whether the calibrated timing and phase are satisfactory. For the description below, the present disclosure uses the case where PMI report value may only be chosen from {0, 1, 2, 3}due to the capability of the user equipment. However, the embodiments disclosed herein may be applied to other cases where PMI report value may be chosen from more possible values.

In particular embodiments, the communication device may determine the plurality of updated calibrated phase measurements at the plurality of respective sub-frequency bands are all zeros. Accordingly, the communication device may determine the calibrated timing and phase mismatch satisfies the target requirement.

In one embodiment, the TRP may only receive the PMI reports from the user equipment with respect to the channel state information reference signal (CSI-RS) with a timing-phase mismatch compensation of φ(f, t). The convergence condition in this case may be given by:

$$\hat{p}(k, t) = 0, \text{ for any } k \in \{1, \dots , K\}. \tag{4}$$

In another embodiment, the TRP may receive PMI reports from the user equipment with respect to two CSI-RS, where the first CSI-RS is transmitted with a timing-phase mismatch compensation of φ(f, t)−θ, and the second CSI-RS is transmitted timing-phase mismatch compensation of φ(f, t)+θ. Here θ is a constant that is related to the required calibration accuracy. As an example and not by way of limitation, $\theta=45-\theta_{min}$, where $\theta_{min}$ is the required calibration accuracy. Let $\widehat{p_1}$ (k, t) and $\widehat{p_2}$ (k, t) denote the PMIreports for the first and second CSI-RS at the k-th subband at the t-th iteration. In this case, the convergence condition may be given by:

$$\widehat{p_n}(k, t) = 0, \text{ for any } k \in \{1, \dots , K\}, \text{ and } n = 1, 2. \tag{5}$$

In particular embodiments, when the convergence condition is satisfied, the calibration may not be invoked, until being triggered by another event. As a result, the embodiments disclosed herein may have a technical advantage of requiring less signaling and having a lower computational complexity as signaling is not needed after the target calibration accuracy is deemed to be satisfied. The detailed description of the embodiment for triggering/re-triggering the calibration is to be descripted later in the present disclosure. By doing this, the overall computational complexity as well as the signaling overhead of the calibration process may be reduced. The present disclosure refers to the states where the convergence condition is satisfied as convergence state. While in convergence state, for every D−1 iteration, the TRP may reset the memory that stores the most recently received D PMI reports, such that every element in matrix M is equal to 0. In other words, the communication device may reset, in a memory storing the one or more first reference signals from the one or more first most recent iterations of the plurality iterations, all calibrated phase measurements associated with the one or more first reference signals to zeros.

With the convergence condition, a TRP may stay in the convergence state once the calibrated timing and phase satisfy the target requirement. However, due to the timing-varying nature of timing-phase mismatch, the TRP may keep checking frequently whether the previously calibrated timing and phase mismatch is still applicable in the current distributed MIMO system. To be responsive to the timing-varying mismatches, in particular embodiments, the TRP may use a divergence condition to check whether it is necessary to re-trigger the calibration process given the TRP has reached the convergence state before. As a result, the embodiments disclosed herein may have a technical advantage of detecting potential changes in timing and phase mismatches between multiple transmission reception points throughout the calibration process as when the changes in mismatches are detected, the embodiments disclosed herein can re-trigger the process of updating the timing and phase mismatches until the required calibration accuracy is achieved again.

In one embodiment, the calibration process may be re-triggered when the majority of the most recently received J PMI reports of an arbitrary sub-band is non-zero. In other words, the communication device may determine a majority of the calibrated phase measurements at an arbitrary sub-frequency band of the plurality of sub-frequency bands of the one or more second reference signals are not zero. The communication device may further determine the calibrated timing and phase mismatch does not satisfy the target requirement. In this case, the divergence condition may be given by:

$$maj(p(k,t), p(k,t-1), \ldots, p(k,t-J)) \neq 0, \tag{6}$$

where maj(·) denotes the function that gives the most frequent element among its arguments (i.e., majority decoding). The technical advantage of using majority decoding in the divergence condition may be that a similar criterion is used in both the convergence and divergence conditions, which may be preferred for practical implementations.

As an example and not by way of limitation, after the convergence, the TRP may first reset matrix M (the matrix that stores the most recent D PMI reports) to all zeros, e.g., $$M = \begin{bmatrix} 0 & 0 & 0 & 0 \\ 0 & 0 & 0 & 0 \\ 0 & 0 & 0 & 0 \end{bmatrix}.$$

Then, the gNB may keep updating M with PMI reports from the user equipment and perform majority decoding to get $\hat{p}(k, t)$. For example, after two iterations, the matrix becomes $$M = \begin{bmatrix} 1 & 0 & 0 & 0 \\ 1 & 0 & 0 & 0 \\ 0 & 0 & 0 & 0 \end{bmatrix}.$$

If any $$\prod\nolimits_{x=t-J}^{x=t} p(k, x) \neq 0,$$

the TRP may re-invoke the calibration to update the calibrated timing and phase.

Divergence condition may also be defined in other formats. In another embodiment, the calibration process may be re-triggered when the TRP receives J consecutive non-zero PMI reports for an arbitrary sub-band. In other words, the communication device may determine the calibrated phase measurements at an arbitrary sub-frequency band of the plurality of sub-frequency bands of the one or more second reference signals are consecutively not zero. The communication device may further determine the calibrated timing and phase mismatch does not satisfy the target requirement. In this case, the divergence condition may be given by:

$$\Pi_{x=t-J}^{x=t} p(k, x) \neq 0. \tag{7}$$

In another embodiment, the PMI reports received within a particular iteration across different frequency bands may be utilized to determine whether the divergence happened. This may reduce required memory for storing matrix M and also enhance the reliability of divergence triggering.

When the divergence condition is satisfied, the TRP may determine its convergence state since the calibrated timing and phase mismatch can no longer meet the requirement. The TRP may invoke the following calibration process to update the calibrated timing and phase mismatch. Keeping checking frequently whether the previously calibrated timing and phase mismatch is still applicable in the current distributed MIMO system based on a divergence condition may be an effective solution for addressing the technical challenge of keeping track of the timing-varying nature of time-phase mismatch as the divergence condition indicates the calibrated timing and phase mismatch can no longer meet the requirement and triggers the updating of the calibration process.

Whenever the TRP is not in the convergence state (which can be due to either i) the convergence state has not yet been reached, or ii) the calibration is re-triggered due to divergence condition), the timing and phase mismatch may be updated based on the PMI reports of the K sub-bands.

In one embodiment, if K=2, the TRP may use one or more first timing calibration techniques to update the timing and phase mismatch. In another embodiment, if K≥3, the TRP may use a second timing calibration technique to update the timing and phase mismatch. More information on timing calibration may be found in U.S. Provisional Patent Application No. 63/522,059, filed on Jun. 20, 2023, U.S. Provisional Patent Application No. 63/426,996, filed on Nov. 21, 2022, and U.S. patent application Ser. No. 18/405,751, filed on Jan. 5, 2024, each of which is incorporated by reference.

Figure 4:
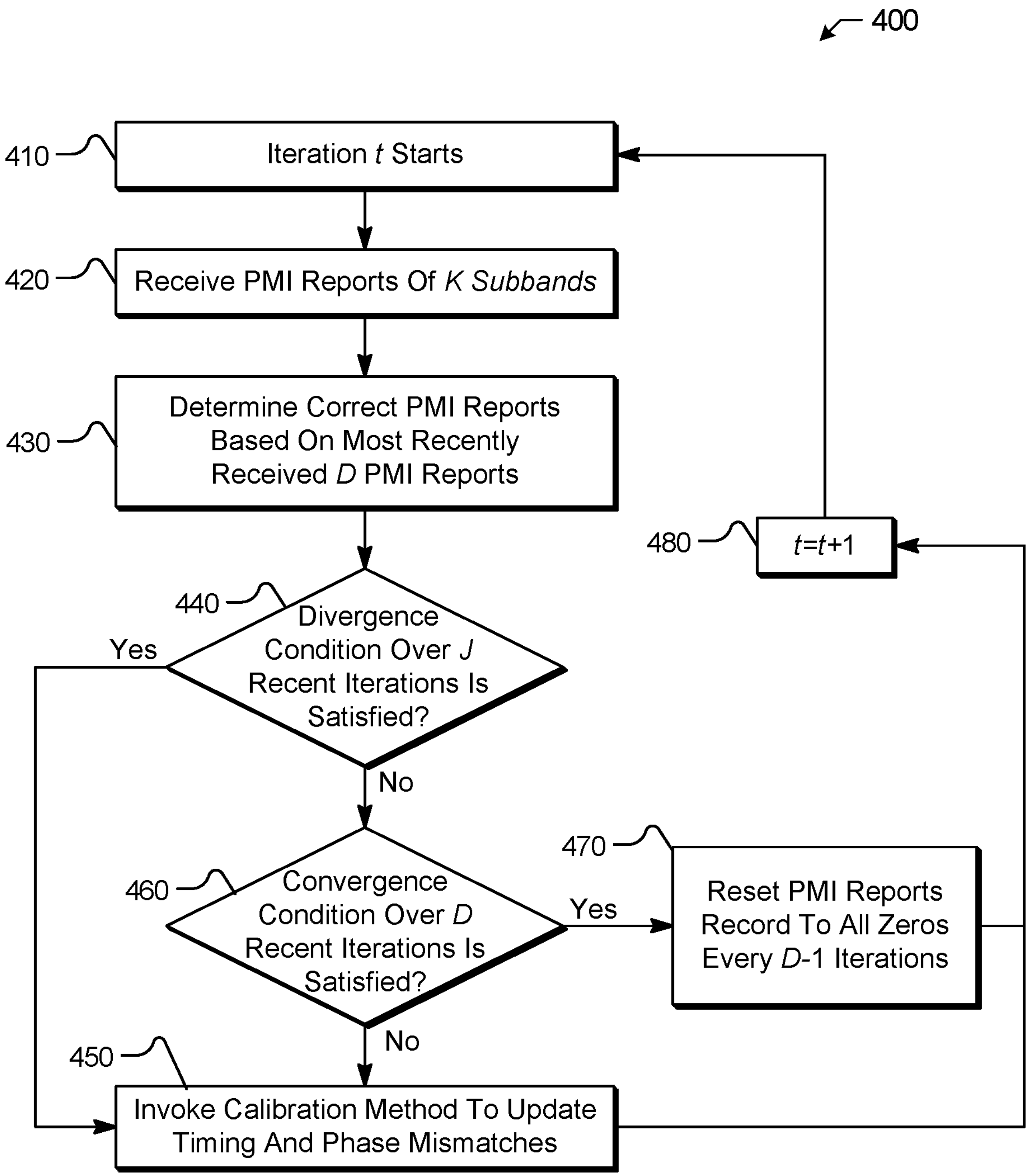
FIG. 4 illustrates an example flow diagram for timing mismatch calibration, in accordance with certain embodiments.

FIG. 4 illustrates an example flow diagram 400 for timing mismatch calibration, in accordance with certain embodiments. At step 410, iteration t may start. At step 420, the TRP may receive PMI reports including calibrated phase measurements of K sub-frequency bands. At step 430, the TRP may determine the correct PMI reports based on most recently received D PMI reports. At step 440, the TRP may determine whether the divergence condition over J recent iterations is satisfied. If the divergence condition is satisfied, the TRP may invoke calibration to update timing and phase mismatches at step 450. If the divergence condition is not satisfied, the TRP may determine whether the convergence condition over D recent iterations is satisfied at step 460. If the convergence condition is not satisfied, the flow diagram 400 may proceed to step 450. If the convergence condition is satisfied, the TRP may reset PMI reports record to all zeros for every D−1 iteration at step 470. After step 450 or step 470, the flow diagram 400 may proceed to the next iteration (t=t+1) at step 480.

Figure 5:
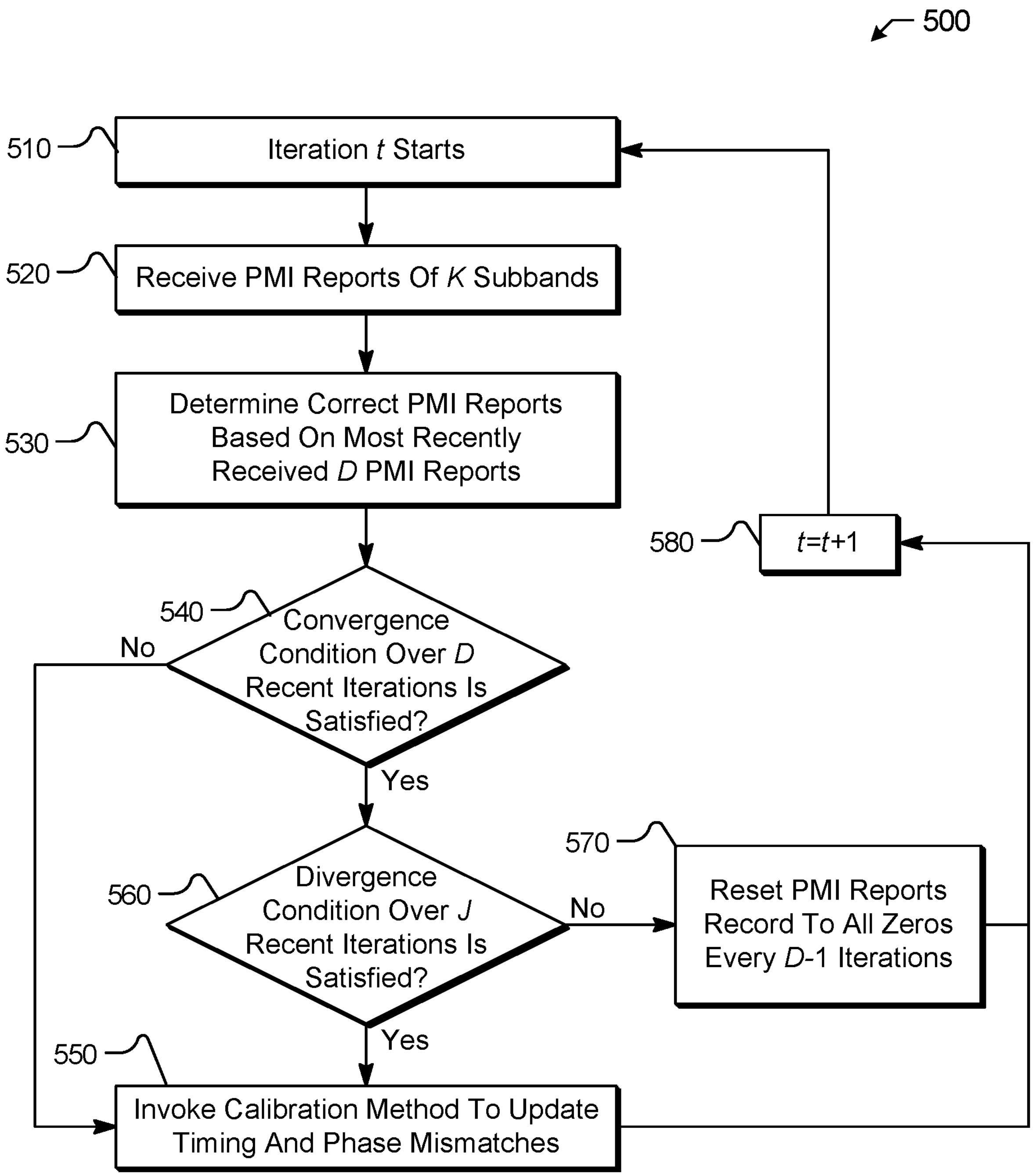
FIG. 5 illustrates another example flow diagram for timing mismatch calibration, in accordance with certain embodiments.

FIG. 5 illustrates another example flow diagram 500 for timing mismatch calibration, in accordance with certain embodiments. At step 510, iteration t may start. At step 520, the TRP may receive PMI reports including calibrated phase measurements of K sub-frequency bands. At step 530, the TRP may determine the correct PMI reports based on most recently received D PMI reports. At step 540, the TRP may determine whether the convergence condition over D recent iterations is satisfied. If the convergence condition is not satisfied, the flow diagram 500 may proceed to step 550, where the TRP may invoke calibration to update timing and phase mismatches. If the convergence condition is satisfied, the TRP may determine whether the divergence condition over J recent iterations is satisfied at step 560. If the divergence condition is satisfied, the TRP may invoke calibration to update timing and phase mismatches at step 550. If the divergence condition is not satisfied, the TRP may reset PMI reports record to all zeros for every D−1 iteration at step 570. After step 550 or step 570, the flow diagram 500 may proceed to the next iteration (t=t+1) at step 580.

The performance of the embodiments disclosed herein was evaluated and validated based on a plurality of simulations. The simulation platform was a 3GPP NR Release 16 system-level simulator (SLS). This SLS can accurately model the practical MIMO systems. Therefore, the results obtained from the SLS can effectively reflect the performance of the embodiments disclosed herein when deployed in practice. All the reported results were averaged over 900 UE drops (i.e., different channel realizations and UE locations) to provide comprehensive evaluations. In particular embodiments, the number of sub-frequency bands K was set as K=4 and the calibration method disclosed in U.S. patent application Ser. No. 18/405,751, filed on Jan. 5, 2024, was used to update the timing and phase mismatches. For the design parameter D, the embodiments disclosed herein evaluated the impact of its value on the calibration accuracy and investigated the most appropriate value for it. For the design parameter J, particular embodiments set j=D to minimize the complexity of implementation. Note that other values of J may also be used in practice. The present disclosure evaluated and compared the performance of the baseline method, where the timing and phase mismatch is updated in each iteration t, using only the PMI reports received in this iteration. That is, in the baseline method, the most recently received D PMI reports are not used, and the convergence condition as well as the divergence condition are not employed.

Figure 6A:
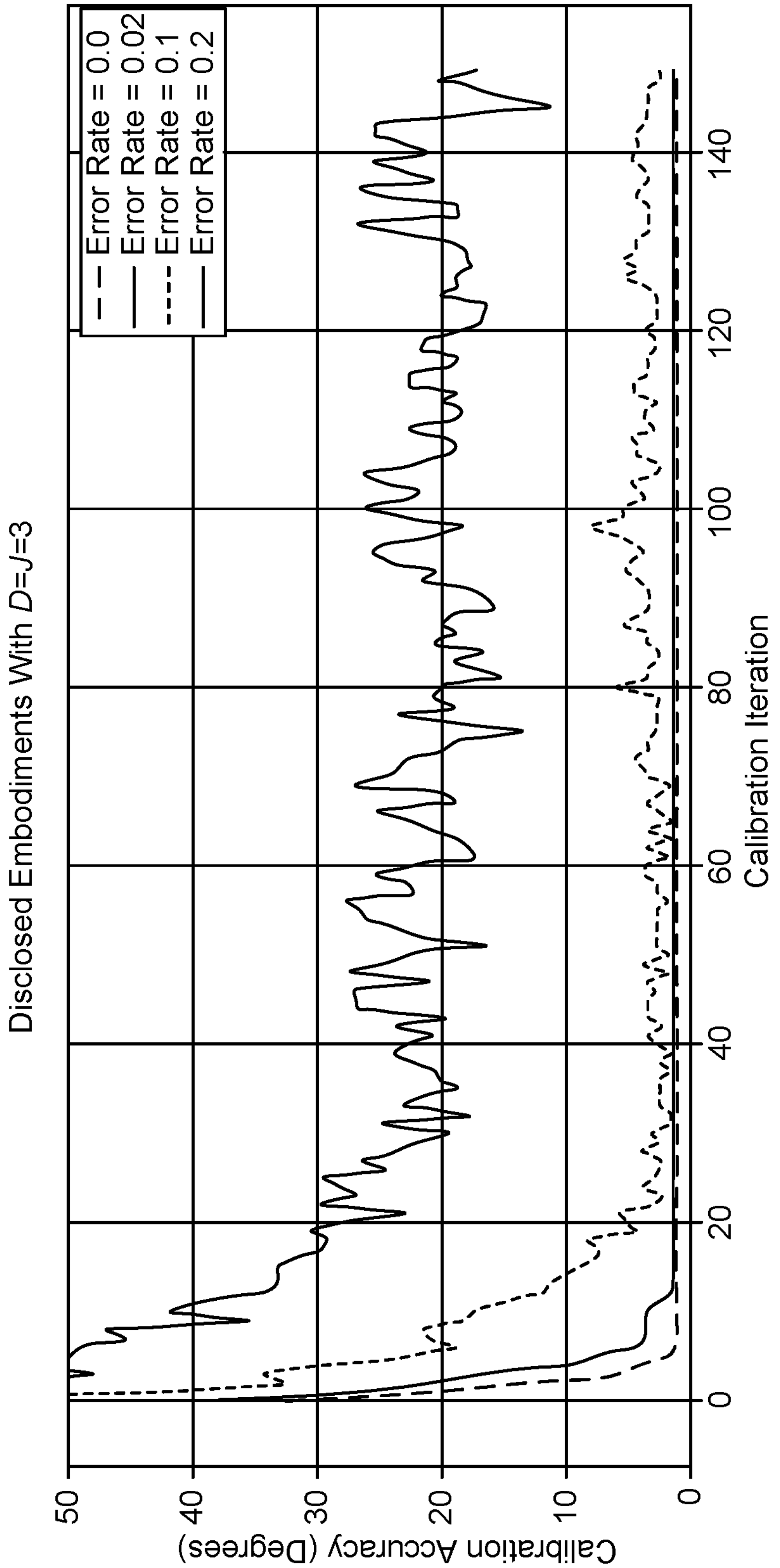
FIG. 6A-6C illustrate the calibration accuracy (in degrees) versus the number of calibration iterations, in accordance with certain embodiments.
Figure 6B:
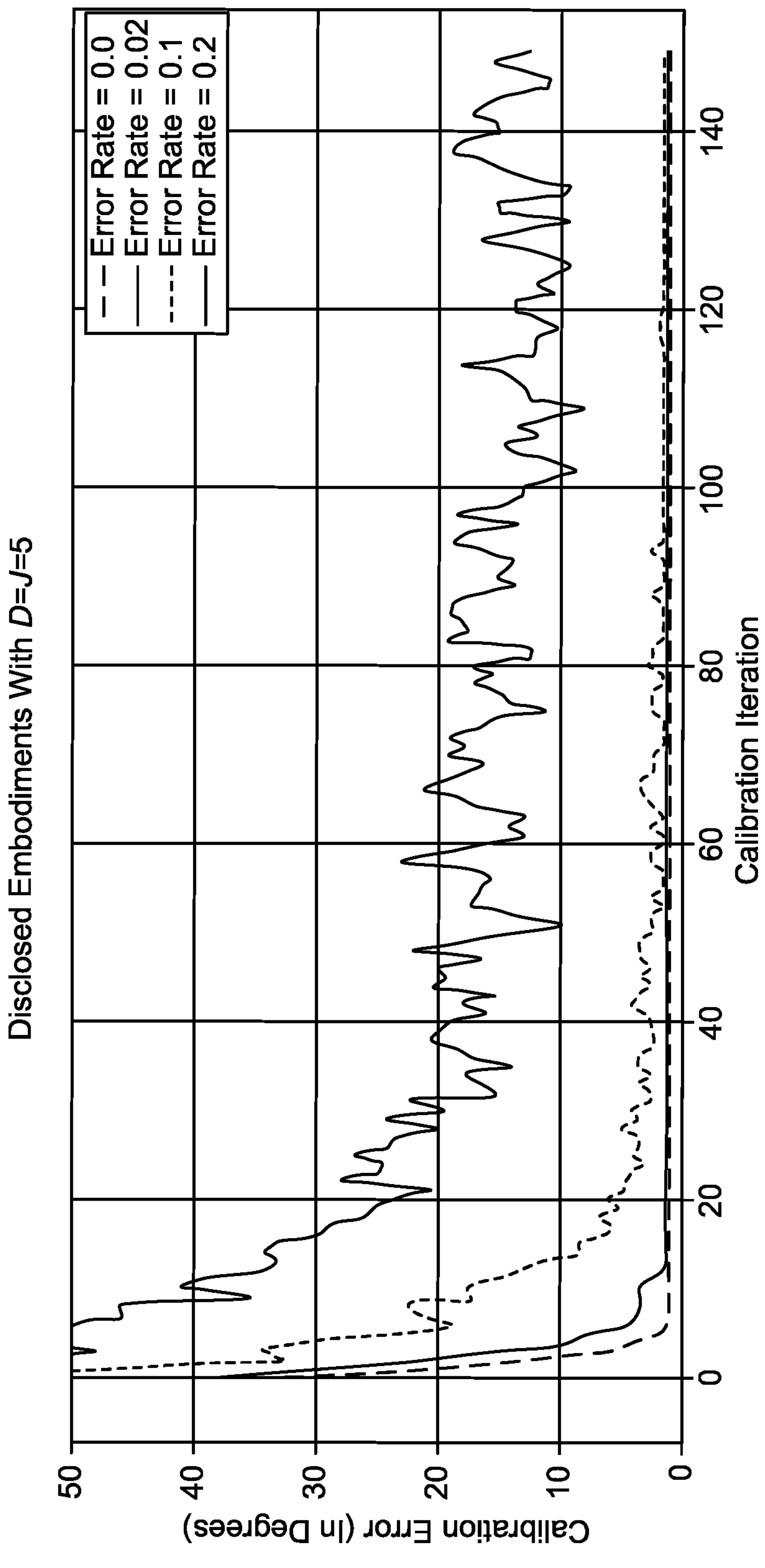
Figure 6C:
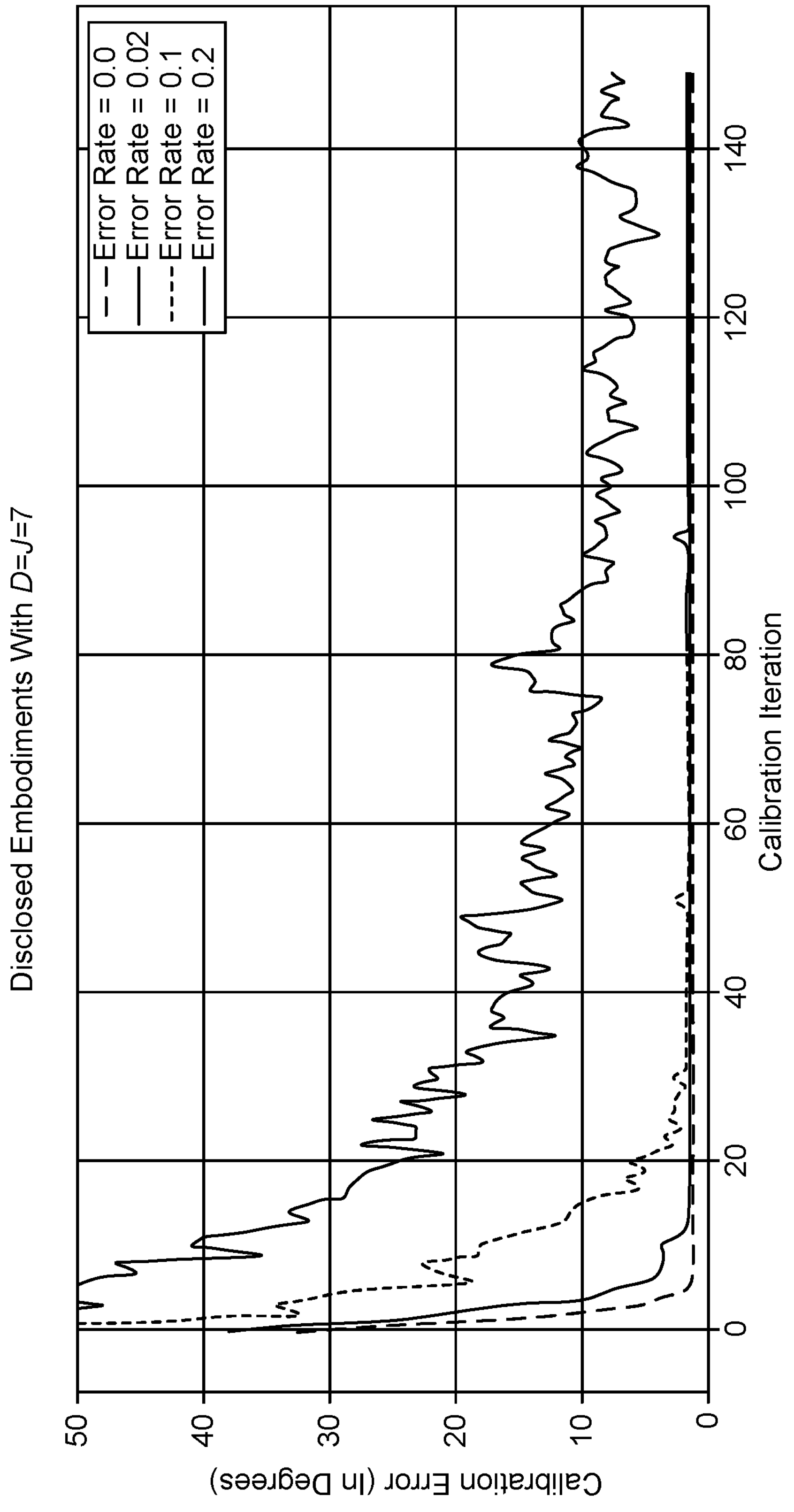

FIG. 6A-6C illustrate the calibration accuracy (in degrees) versus the number of calibration iterations, in accordance with certain embodiments. In FIG. 6A, the design parameter D=3. The performance of the embodiments disclosed herein was investigated under different PMI report error probability (e.g., 0%, 2%, 10%, and 20%). It may be observed that the embodiments disclosed herein may achieve less than 10 degrees calibration accuracy with; 10% PMI report probability. In FIG. 6B and FIG. 6C, the value of D was further increased to 5 and 7, respectively. It may be observed that with a larger D, a higher calibration accuracy, i.e., a lower calibration error, may be obtained after the iterations. Moreover, it may be also observed that a larger D reduces the fluctuation in the calibration error, leading to a more stable performance.

Figure 7:
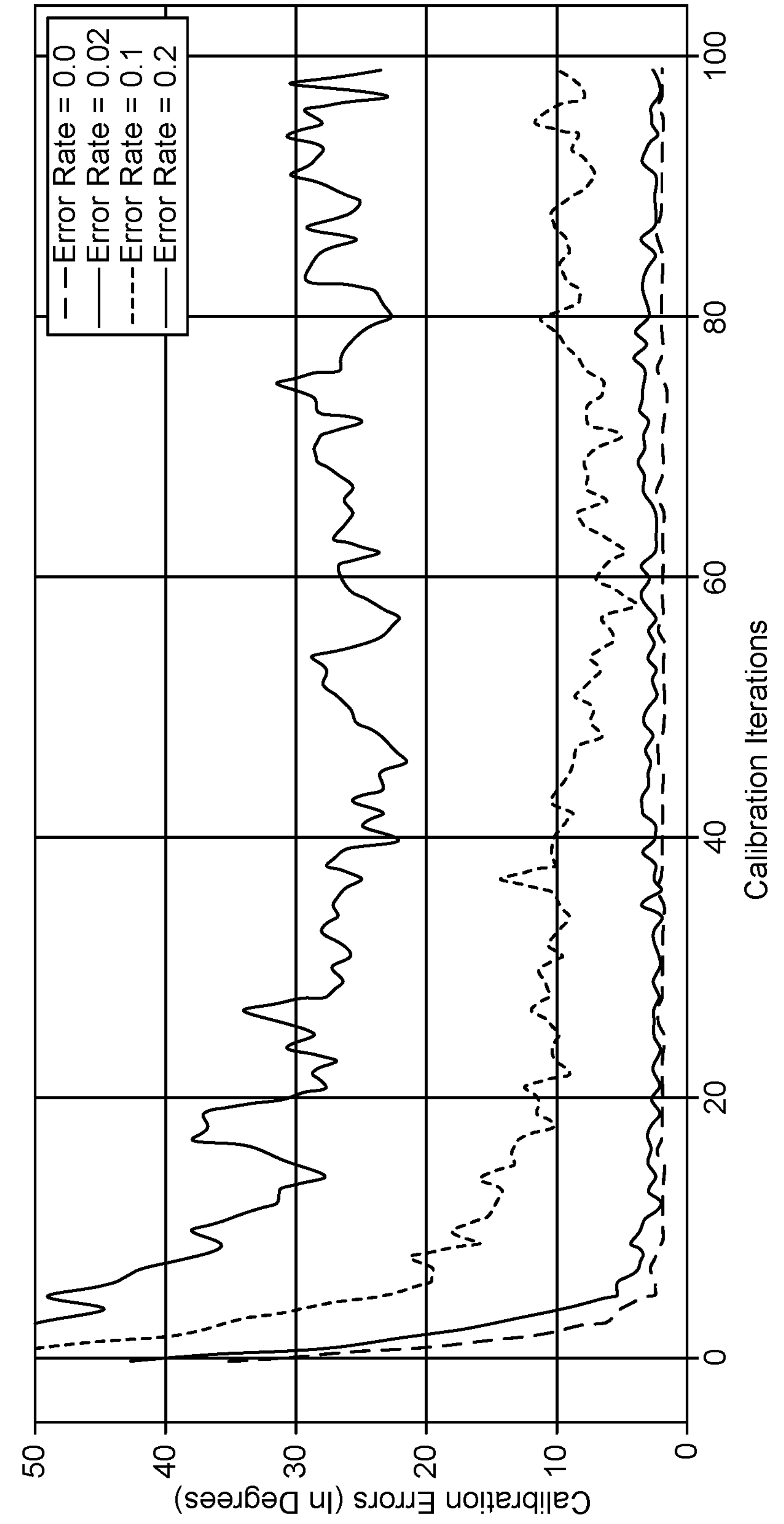
FIG. 7 illustrates the calibration performance of the baseline method for comparison.

FIG. 7 illustrates the calibration performance of the baseline method for comparison. It may be observed that while the baseline method performs relatively well with low PMI report error probabilities, e.g., 0% and 2%, it suffers significant performance degradation when the error probability increases. This may be because the baseline method may not have the capability to tackle the incorrect PMI reports due to errors. In the baseline method, the calibrated timing and phase mismatches may be updated based on those PMI reports with errors, which may lead to larger calibration errors and lower accuracies.

To better illustrate the technical advantages of the embodiments disclosed herein over the baseline method, Table 1 summarizes the calibration accuracies by the embodiments disclosed herein (with different values of D) and a baseline method under different PMI report error probabilities. The baseline method is the method in which the calibration is invoked to update timing and phase mismatches (i.e., step 450 in FIG. 4 and step 550 in FIG. 5) in every iteration. In other words, in the baseline method, the convergence and divergence conditions disclosed herein are completely ignored. It may be observed that the embodiments disclosed herein outperform the baseline method under different values of D and different PMI report error probabilities. The technical advantages of the embodiments disclosed herein become more significant with a higher PMI report error probability and/or a larger design parameter D.

TABLE 1

Calibration Accuracies of Different Methods under Different PMI Report Error Probabilities.

| | Average Calibration Error in Degrees Methods | | | |
|---|---|---|---|---|
| Methods | PMI error probability = 0% | PMI error probability = 2% | PMI error probability = 10% | PMI error probability = 20% |
| Embodiments disclosed herein, D = 3 | 1.074 | 1.284 | 3.660 | 21.273 |
| Embodiments disclosed herein, D = 5 | 1.074 | 1.299 | 1.541 | 12.203 |
| Embodiments disclosed herein, D = 7 | 1.074 | 1.362 | 1.422 | 7.626 |
| Baseline method | 1.735 | 2.852 | 8.407 | 27.110 |

Figure 8:
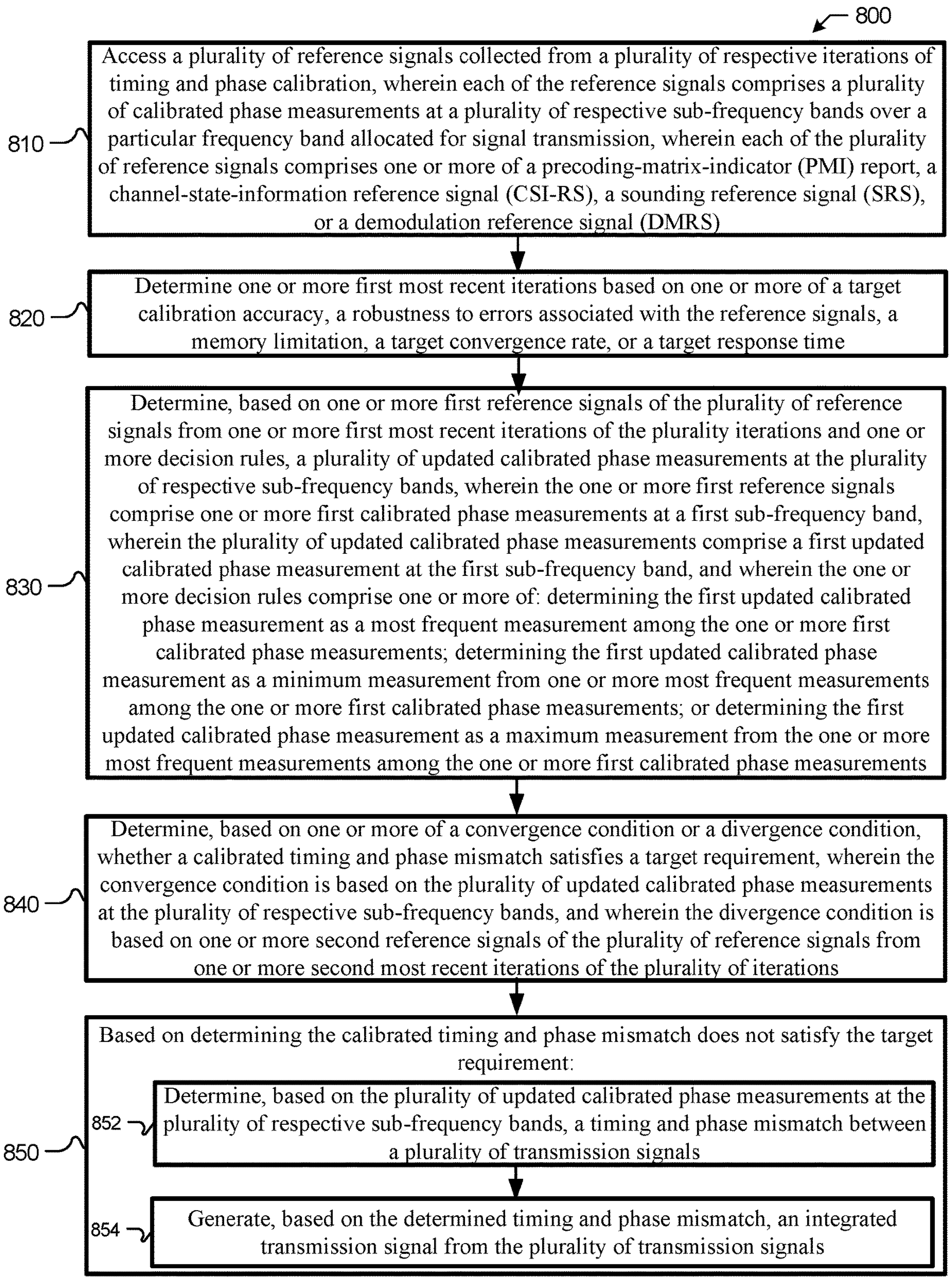
FIG. 8 illustrates is a flow diagram of a method for timing mismatch calibration using historical measurements, in accordance with the presently disclosed embodiments.

FIG. 8 illustrates is a flow diagram of a method 800 for timing mismatch calibration using historical measurements, in accordance with the presently disclosed embodiments. The method 800 may be performed utilizing one or more processing devices (e.g., a communication device) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing wireless communication data, software (e.g., instructions running/executing on one or more processors), firmware (e.g., microcode), or some combination thereof.

The method 800 may begin at step 810 with the one or more processing devices (e.g., the communication device). For example, in particular embodiments, the communication device may access a plurality of reference signals collected from a plurality of respective iterations of timing and phase calibration, wherein each of the reference signals comprises a plurality of calibrated phase measurements at a plurality of respective sub-frequency bands over a particular frequency band allocated for signal transmission, wherein each of the plurality of reference signals comprises one or more of a precoding-matrix-indicator (PMI) report, a channel-state-information reference signal (CSI-RS), a sounding reference signal (SRS), or a demodulation reference signal (DMRS). The method 800 may then continue at step 820 with the one or more processing devices (e.g., the communication device). For example, in particular embodiments, the communication device may determine one or more first most recent iterations based on one or more of a target calibration accuracy, a robustness to errors associated with the reference signals, a memory limitation, a target convergence rate, or a target response time. The method 800 may then continue at step 830 with the one or more processing devices (e.g., the communication device). For example, in particular embodiments, the communication device may determine, based on one or more first reference signals of the plurality of reference signals from one or more first most recent iterations of the plurality iterations and one or more decision rules, a plurality of updated calibrated phase measurements at the plurality of respective sub-frequency bands, wherein the one or more first reference signals comprise one or more first calibrated phase measurements at a first sub-frequency band, wherein the plurality of updated calibrated phase measurements comprise a first updated calibrated phase measurement at the first sub-frequency band, and wherein the one or more decision rules comprise one or more of: determining the first updated calibrated phase measurement as a most frequent measurement among the one or more first calibrated phase measurements; determining the first updated calibrated phase measurement as a minimum measurement from one or more most frequent measurements among the one or more first calibrated phase measurements; or determining the first updated calibrated phase measurement as a maximum measurement from the one or more most frequent measurements among the one or more first calibrated phase measurements. The method 800 may then continue at step 840 with the one or more processing devices (e.g., the communication device). For example, in particular embodiments, the communication device may determine, based on one or more of a convergence condition or a divergence condition, whether a calibrated timing and phase mismatch satisfies a target requirement, wherein the convergence condition is based on the plurality of updated calibrated phase measurements at the plurality of respective sub-frequency bands, and wherein the divergence condition is based on one or more second reference signals of the plurality of reference signals from one or more second most recent iterations of the plurality of iterations. The method 800 may then continue at step 850 with the one or more processing devices (e.g., the communication device) based on determining the calibrated timing and phase mismatch does not satisfy the target requirement. For example, in particular embodiments, at sub-step 852, the communication device may determine, based on the plurality of updated calibrated phase measurements at the plurality of respective sub-frequency bands, a timing and phase mismatch between a plurality of transmission signals. The method 800 may then continue at sub-step 854 with the one or more processing devices (e.g., the communication device). For example, in particular embodiments, the communication device may generate, based on the determined timing and phase mismatch, an integrated transmission signal from the plurality of transmission signals. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for timing mismatch calibration using historical measurements including the particular steps of the method of FIG. 8, this disclosure contemplates any suitable method for timing mismatch calibration using historical measurements including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Systems and Methods

Figure 9:
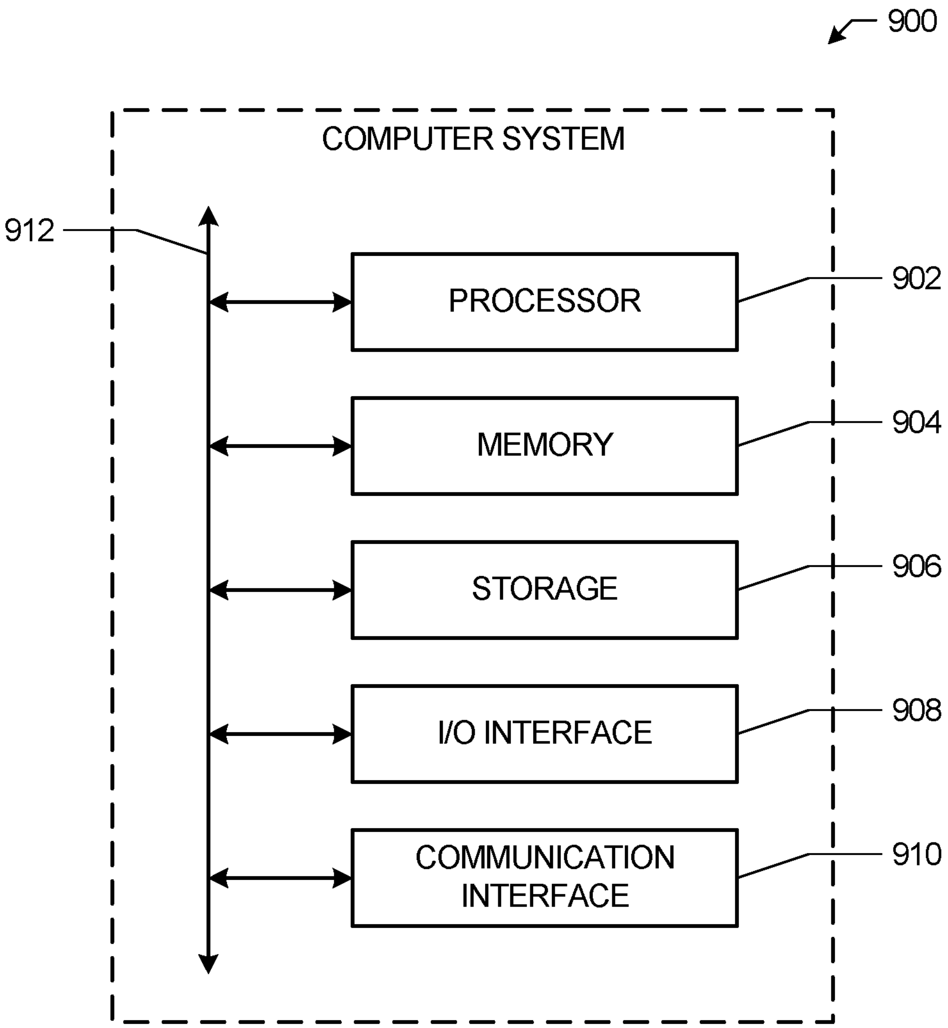
FIG. 9 illustrates an example computer system that may be utilized for timing mismatch calibration using historical measurements, in accordance with the presently disclosed embodiments.

FIG. 9 illustrates an example computer system 900 that may be utilized for timing mismatch calibration using historical measurements, in accordance with the presently disclosed embodiments. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks.

Where appropriate, one or more computer systems 900 may perform without substantial spatial or temporal limitation one or more steps of one or more methods described or illustrated herein. As an example, and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement. In particular embodiments, processor 902 includes hardware for executing instructions, such as those making up a computer program. As an example, and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example, and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902.

Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example, and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere).

One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memory devices, where appropriate. Although this disclosure describes and illustrates particular memory, this disclosure contemplates any suitable memory.

In particular embodiments, storage 906 includes mass storage for data or instructions. As an example, and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it.

As an example, and not by way of limitation, computer system 900 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example, and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a communication device:

accessing a plurality of reference signals collected from a plurality of respective iterations of timing and phase calibration, wherein each of the reference signals comprises a plurality of calibrated phase measurements at a plurality of respective sub-frequency bands over a particular frequency band allocated for signal transmission;

determining, based on one or more first reference signals of the plurality of reference signals from one or more first most recent iterations of the plurality iterations and one or more decision rules, a plurality of updated calibrated phase measurements at the plurality of respective sub-frequency bands;

determining, based on one or more of a convergence condition or a divergence condition, whether a calibrated timing and phase mismatch satisfies a target requirement, wherein the convergence condition is based on the plurality of updated calibrated phase measurements at the plurality of respective sub-frequency bands, and wherein the divergence condition is based on one or more second reference signals of the plurality of reference signals from one or more second most recent iterations of the plurality of iterations; and based on determining the calibrated timing and phase mismatch does not satisfy the target requirement:

determining, based on the plurality of updated calibrated phase measurements at the plurality of respective sub-frequency bands, a timing and phase mismatch between a plurality of transmission signals; and generating, based on the determined timing and phase mismatch, an integrated transmission signal from the plurality of transmission signals.

2. The method of claim 1, wherein each of the plurality of reference signals comprises one or more of a precoding-matrix-indicator (PMI) report, a channel-state-information reference signal (CSI-RS), a sounding reference signal (SRS), or a demodulation reference signal (DMRS).

3. The method of claim 1, wherein the one or more first reference signals comprise one or more first calibrated phase measurements at a first sub-frequency band, wherein the plurality of updated calibrated phase measurements comprise a first updated calibrated phase measurement at the first sub-frequency band, and wherein the one or more decision rules comprise one or more of:

determining the first updated calibrated phase measurement as a most frequent measurement among the one or more first calibrated phase measurements;

determining the first updated calibrated phase measurement as a minimum measurement from one or more most frequent measurements among the one or more first calibrated phase measurements; or determining the first updated calibrated phase measurement as a maximum measurement from the one or more most frequent measurements among the one or more first calibrated phase measurements.

4. The method of claim 1, further comprising:

determining the one or more first most recent iterations based on one or more of a target calibration accuracy, a robustness to errors associated with the reference signals, a memory limitation, a target convergence rate, or a target response time.

5. The method of claim 1, further comprising:

determining the plurality of updated calibrated phase measurements at the plurality of respective sub-frequency bands are all zeros; and determining the calibrated timing and phase mismatch satisfies the target requirement.

6. The method of claim 5, further comprising:

resetting, in a memory storing the one or more first reference signals, all calibrated phase measurements associated with the one or more first reference signals to zeros.

7. The method of claim 1, further comprising:

determining a majority of the calibrated phase measurements at an arbitrary sub-frequency band of the plurality of sub-frequency bands of the one or more second reference signals are not zero; and determining the calibrated timing and phase mismatch does not satisfy the target requirement.

8. The method of claim 1, further comprising:

determining the calibrated phase measurements at an arbitrary sub-frequency band of the plurality of sub-frequency bands of the one or more second reference signals are consecutively not zero; and determining the calibrated timing and phase mismatch does not satisfy the target requirement.

9. An electronic device comprising:

one or more non-transitory computer-readable storage media including instructions; and one or more processors coupled to the storage media, the one or more processors configured to execute the instructions to:

access a plurality of reference signals collected from a plurality of respective iterations of timing and phase calibration, wherein each of the reference signals comprises a plurality of calibrated phase measurements at a plurality of respective sub-frequency bands over a particular frequency band allocated for signal transmission;

determine, based on one or more first reference signals of the plurality of reference signals from one or more first most recent iterations of the plurality iterations and one or more decision rules, a plurality of updated calibrated phase measurements at the plurality of respective sub-frequency bands;

determine, based on one or more of a convergence condition or a divergence condition, whether a calibrated timing and phase mismatch satisfies a target requirement, wherein the convergence condition is based on the plurality of updated calibrated phase measurements at the plurality of respective sub-frequency bands, and wherein the divergence condition is based on one or more second reference signals of the plurality of reference signals from one or more second most recent iterations of the plurality of iterations; and based on determining the calibrated timing and phase mismatch does not satisfy the target requirement:

determine, based on the plurality of updated calibrated phase measurements at the plurality of respective sub-frequency bands, a timing and phase mismatch between a plurality of transmission signals; and generate, based on the determined timing and phase mismatch, an integrated transmission signal from the plurality of transmission signals.

10. The electronic device of claim 9, wherein each of the plurality of reference signals comprises one or more of a precoding-matrix-indicator (PMI) report, a channel-state-information reference signal (CSI-RS), a sounding reference signal (SRS), or a demodulation reference signal (DMRS).

11. The electronic device of claim 9, wherein the one or more first reference signals comprise one or more first calibrated phase measurements at a first sub-frequency band, wherein the plurality of updated calibrated phase measurements comprise a first updated calibrated phase measurement at the first sub-frequency band, and wherein the one or more decision rules comprise one or more of:

determining the first updated calibrated phase measurement as a most frequent measurement among the one or more first calibrated phase measurements;

determining the first updated calibrated phase measurement as a minimum measurement from one or more most frequent measurements among the one or more first calibrated phase measurements; or determining the first updated calibrated phase measurement as a maximum measurement from the one or more most frequent measurements among the one or more first calibrated phase measurements.

12. The electronic device of claim 9, wherein the one or more processors are further configured to execute the instructions to:

determine the one or more first most recent iterations based on one or more of a target calibration accuracy, a robustness to errors associated with the reference signals, a memory limitation, a target convergence rate, or a target response time.

13. The electronic device of claim 9, wherein the one or more processors are further configured to execute the instructions to:

determine the plurality of updated calibrated phase measurements at the plurality of respective sub-frequency bands are all zeros; and determine the calibrated timing and phase mismatch satisfies the target requirement.

14. The electronic device of claim 9, wherein the one or more processors are further configured to execute the instructions to:

reset, in a memory storing the one or more first reference signals, all calibrated phase measurements associated with the one or more first reference signals to zeros.

15. The electronic device of claim 9, wherein the one or more processors are further configured to execute the instructions to:

determine a majority of the calibrated phase measurements at an arbitrary sub-frequency band of the plurality of sub-frequency bands of the one or more second reference signals are not zero; and determine the calibrated timing and phase mismatch does not satisfy the target requirement.

16. The electronic device of claim 9, wherein the one or more processors are further configured to execute the instructions to:

determine the calibrated phase measurements at an arbitrary sub-frequency band of the plurality of sub-frequency bands of the one or more second reference signals are consecutively not zero; and determine the calibrated timing and phase mismatch does not satisfy the target requirement.

17. A computer-readable non-transitory storage media comprising instructions executable by a processor to:

access a plurality of reference signals collected from a plurality of respective iterations of timing and phase calibration, wherein each of the reference signals comprises a plurality of calibrated phase measurements at a plurality of respective sub-frequency bands over a particular frequency band allocated for signal transmission;

determine, based on one or more first reference signals of the plurality of reference signals from one or more first most recent iterations of the plurality iterations and one or more decision rules, a plurality of updated calibrated phase measurements at the plurality of respective sub-frequency bands;

determine, based on one or more of a convergence condition or a divergence condition, whether a calibrated timing and phase mismatch satisfies a target requirement, wherein the convergence condition is based on the plurality of updated calibrated phase measurements at the plurality of respective sub-frequency bands, and wherein the divergence condition is based on one or more second reference signals of the plurality of reference signals from one or more second most recent iterations of the plurality of iterations; and based on determining the calibrated timing and phase mismatch does not satisfy the target requirement:

determine, based on the plurality of updated calibrated phase measurements at the plurality of respective sub-frequency bands, a timing and phase mismatch between a plurality of transmission signals; and generate, based on the determined timing and phase mismatch, an integrated transmission signal from the plurality of transmission signals.

18. The computer-readable non-transitory storage media of claim 17, wherein each of the plurality of reference signals comprises one or more of a precoding-matrix-indicator (PMI) report, a channel-state-information reference signal (CSI-RS), a sounding reference signal (SRS), or a demodulation reference signal (DMRS).

19. The computer-readable non-transitory storage media of claim 17, wherein the one or more first reference signals comprise one or more first calibrated phase measurements at a first sub-frequency band, wherein the plurality of updated calibrated phase measurements comprise a first updated calibrated phase measurement at the first sub-frequency band, and wherein the one or more decision rules comprise one or more of:

determining the first updated calibrated phase measurement as a most frequent measurement among the one or more first calibrated phase measurements;

determining the first updated calibrated phase measurement as a minimum measurement from one or more most frequent measurements among the one or more first calibrated phase measurements; or determining the first updated calibrated phase measurement as a maximum measurement from the one or more most frequent measurements among the one or more first calibrated phase measurements.

20. The computer-readable non-transitory storage media of claim 17, further comprising instructions executable by the processor to:

determine the one or more first most recent iterations based on one or more of a target calibration accuracy, a robustness to errors associated with the reference signals, a memory limitation, a target convergence rate, or a target response time.

* * * * *